United States Patent [19]

Svede

[11] 3,842,985
[45] Oct. 22, 1974

[54] MEANS FOR EXTENDING AND RETRACTING CRANE BOOM SECTION
[75] Inventor: George E. Svede, Cedar Rapids, Iowa
[73] Assignee: Harnischfeger Corporation, Milwaukee, Wis.
[22] Filed: Dec. 15, 1972
[21] Appl. No.: 315,584

[52] U.S. Cl. .................................. 212/55, 52/121
[51] Int. Cl. ............................................. B66c 23/04
[58] Field of Search ........... 212/55; 52/121; 70/280, 70/281, 282; 292/144

[56] References Cited
UNITED STATES PATENTS

| | | | |
|---|---|---|---|
| 3,360,970 | 1/1968 | Hays | 292/144 |
| 3,368,696 | 2/1968 | Johnston et al. | 212/59 |
| 3,386,594 | 6/1968 | Grove | 212/55 |
| 3,462,023 | 8/1969 | Grove | 212/55 |

FOREIGN PATENTS OR APPLICATIONS

| | | | |
|---|---|---|---|
| 1,268,804 | 5/1968 | Germany | 212/55 |
| 236,259 | 11/1961 | Australia | 70/281 |

Primary Examiner—Richard A. Schacher
Assistant Examiner—Jeffrey V. Nase
Attorney, Agent, or Firm—James E. Nilles

[57] ABSTRACT

Means for extending and retracting a section of a multisection telescopic crane boom that lacks its own extend-retract hydraulic cylinder are disclosed. Such means comprise a boom having a base section, an inner mid section and hydraulic cylinder therefor, an outer mid section and hydraulic cylinder therefor, a fly section and hydraulic cylinder therefor, and a manual section. Two solenoid operated tapered pins are mounted in longitudinally spaced apart relationship on the manual section. The forward pin cooperates with a forward pin hole and a rearward pin hole in the fly section. The rear pin cooperates with a pin hole in the cylinder for the outer mid section. Extending the manual section for use (assuming all movable sections and cylinders retracted) involves: extending the fly section with the manual section pinned thereto; energizing both solenoids to unpin the manual section from the fly section and to pin the former to the outer mid cylinder; retracting the fly section; and deenergizing both solenoids to unpin the manual section (now extended) to the fly section and to unpin the manual section from the outer mid cylinder. The method of retracting the manual section is the reverse of extending it.

1 Claim, 13 Drawing Figures

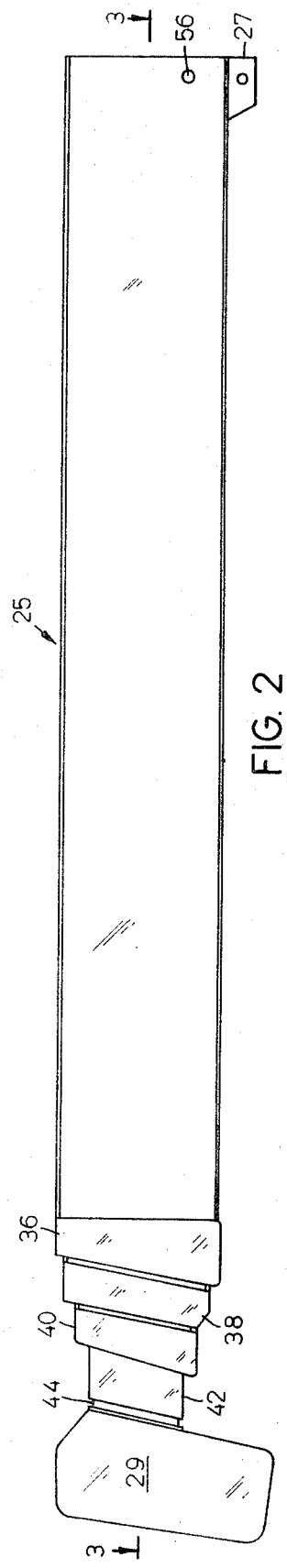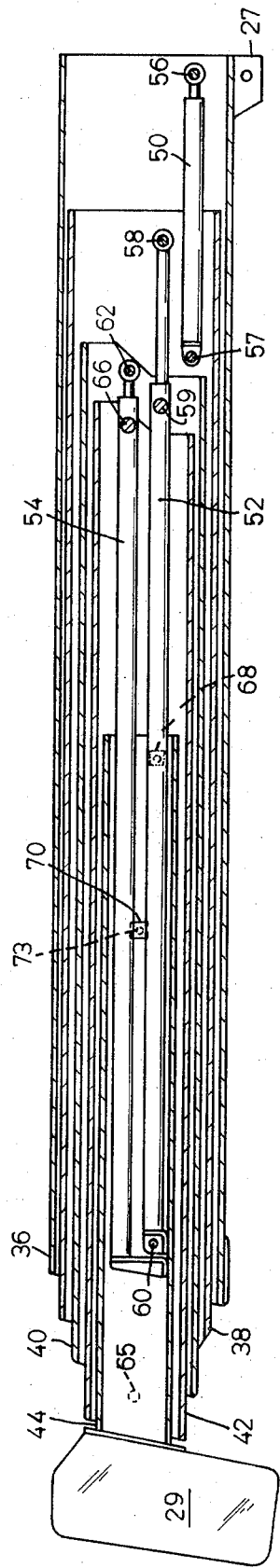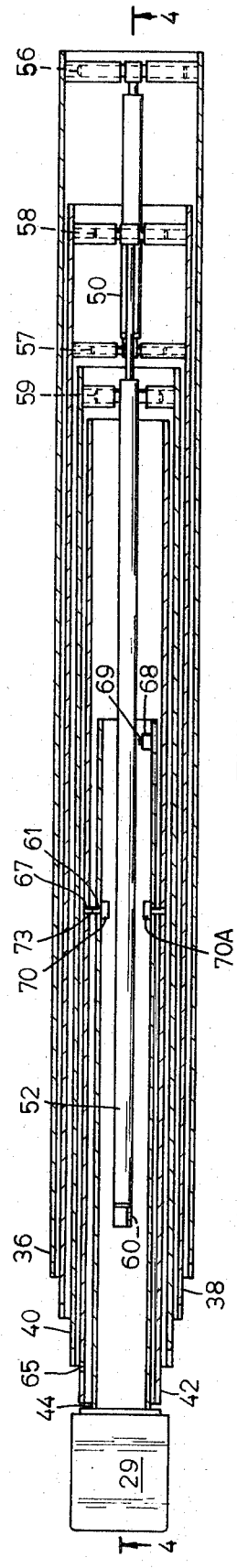

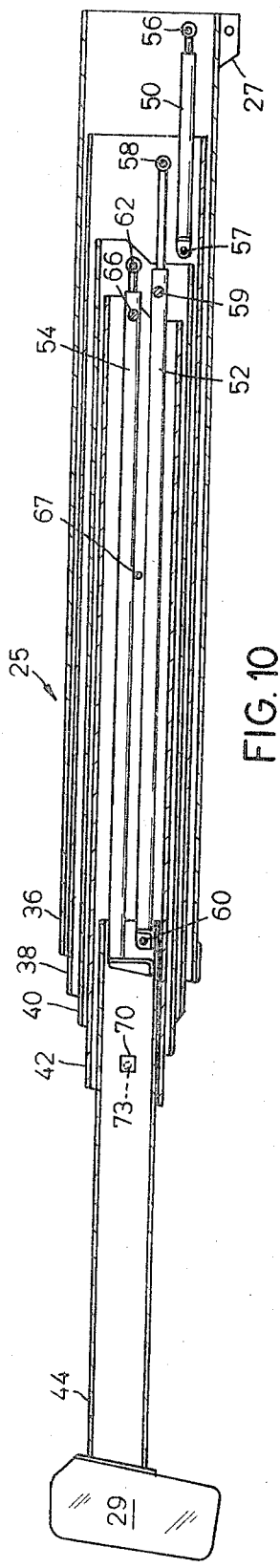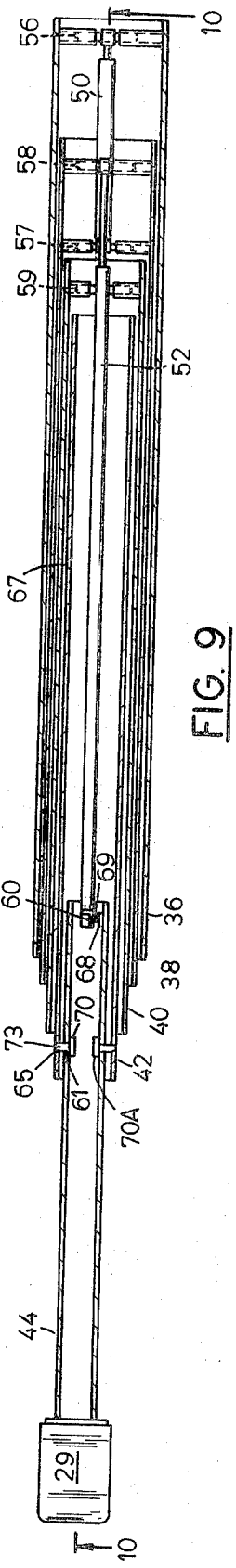

PATENTED OCT 22 1974 3,842,985

MEANS FOR EXTENDING AND RETRACTING CRANE BOOM SECTION

BACKGROUND OF THE INVENTION

1. Field of Use

This invention relates generally to means for extending and retracting a section of a multisection telescopic crane boom, such as is used in a mobile crane, that lacks its own extend-retract hydraulic cylinder.

2. Description of the Prior Art

Some mobile cranes employ a multisection telescopic boom having a small, relatively light-weight end section which is optionally extendable to increase boom length. To conserve space and weight and to reduce cost, manufacturing costs, this end section is not provided with a separate extend-retract hydraulic cylinder, as are the other movable boom sections. Instead, it is extended and retracted manually, or by a cable and pulley arrangement, or by some other means, and secured in desired position by manually inserted pins or bolts. Hence, this end section is usually referred to as a "manual" section. U.S. Pat. application Ser. No. 254,665, filed May 18, 1972 by R. L. Johnston for "Telescoping Crane Boom" and assigned to the same assignee as the present application, discloses a boom of the aforesaid type wherein a set of manually insertable and removable pins are employed for cooperation with various pinning holes in certain boom sections to enable the end section to be extended and retracted by operation of an adjacent boom section. In some prior art booms of this type, manual insertion and removal of the pins is very difficult because of the size and weight of the boom sections. Furthermore, manual insertion of the pins requires access holes in addition to pinning holes and careful positioning of the boom sections to align the pinning holes and access holes for pin insertion and removal.

SUMMARY OF THE PRESENT INVENTION

The present invention provides improved means for extending and retracting an end section (hereinafter referred to as a manual section) of a multisection telescopic crane boom, such as is used on a mobile crane, that lacks its own extend-retract hydraulic cylinder. The invention contemplates a boom having, for example, five tubular sections, namely: a base section, an inner mid section, an outer mid section, a fly section, and a manual section. The invention further contemplates, for example, three linearly extendable and retractable hydraulic cylinders, namely: an inner mid cylinder connected to and between the base and inner mid section for moving the latter section; an outer mid cylinder connected to and between the inner mid and outer mid sections for moving the latter section; and a fly cylinder connected to and between the outer mid and the fly sections for moving the latter section.

In accordance with the invention, at least one forward pinning hole is provided near the forward end of the fly section and at least one rear pinning hole is provided near the rear end of the fly section. The outer mid cylinder is also provided with a pinning hole near the forward end thereof. Two remotely controlled solenoid operated tapered pins mounted in longitudinally spaced apart relationship on the manual section cooperate with the two pin holes in the fly section and the pin hole on the outer mid cylinder to facilitate extension (for use) and retraction (for storage) of the manual section. When the solenoids are deenergized, (preferably simultaneously) the forward pin extends and the rear pin retracts. When the solenoids are energized (preferably simultaneously), the forward pin retracts and the rear pin extends. A method of extending the manual section in accordance with the invention involves initially providing the boom with all movable sections retracted, all cylinders retracted and both solenoids deenergized. The fly cylinder is extended to extend the fly section with the manual section pinned thereto. Both solenoids are energized to unpin the manual section from the fly section and to pin the manual section to the outer mid cylinder. The fly cylinder is retracted to expose the manual section and the solenoids are deenergized to repin the manual section (now extended) to the fly section and to unpin the manual section from the outer mid cylinder. A method for retracting the extended manual section involves energizing the solenoids to unpin the manual section from the fly section and to pin the manual section to the outer mid cylinder. The fly section is extended to enclose the manual section and the solenoids are deenergized to pin the manual section to the fly section and to unpin the manual section from the outer mid cylinder. The fly cylinder is retracted to retract the fly section with the manual section pinned therewithin.

The means in accordance with the invention enable rapid and relatively easy extension and retraction of the manual section and eliminates the need for auxiliary tackle and extra men to accomplish these functions. The pinning means, which can be remotely operated from the crane cab, can be economically installed on existing cranes or during the manufacture of new cranes. Other objects and advantages will hereinafter appear.

DRAWINGS

FIG. 2 is a side elevational view of a crane boom in acordance with the invention showing it in horizontal position and with its extendable and retractable sections fully retracted into the base section;

FIG. 3 is a cross-sectional view of the boom taken on line 3—3 of FIG. 2;

FIG. 4 is a cross-sectional view of the boom taken on line 4—4 of FIG. 3;

FIG. 9 is a cross-sectional view of the boom similar to FIG. 5 but showing the certain boom section extended;

FIG. 10 is a cross-sectional view of the boom taken on line 10—10 of FIG. 9;

DESCRIPTION OF A PREFERRED EMBODIMENT

Figure 1:
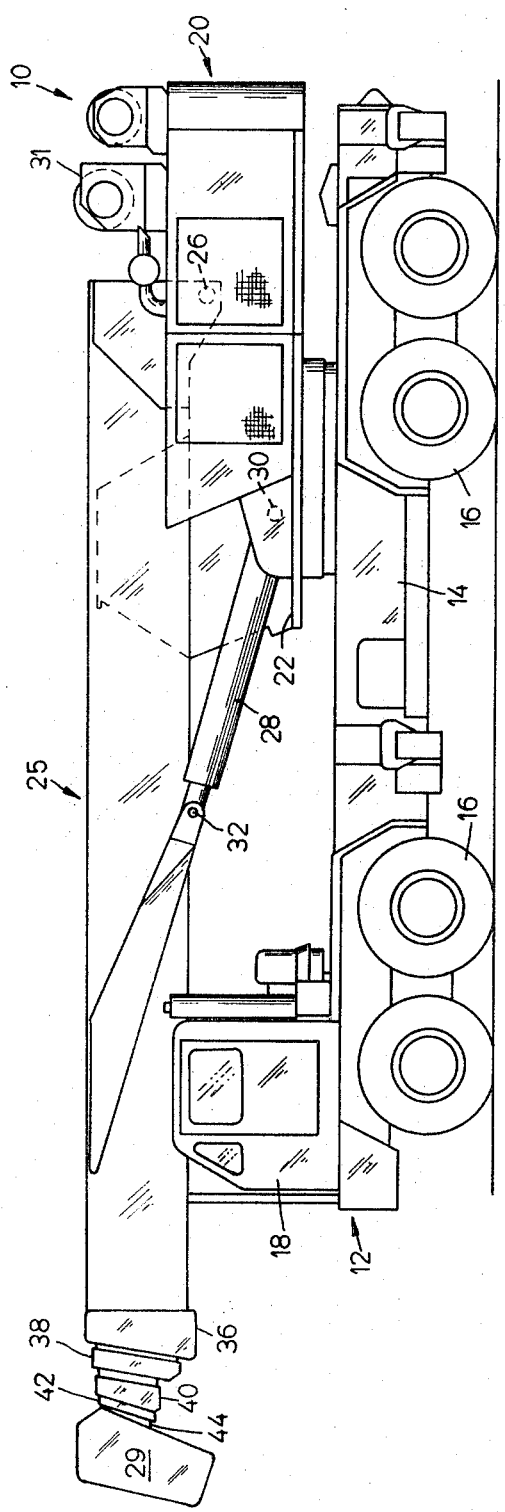
FIG. 1 is a side elevation view of a mobile crane employing a crane boom in accordance with the present invention.

Referring to FIG. 1 the numeral 10 designates a mobile crane in accordance with the present invention. Crane 10 comprises a vehicle, such as a truck 12, having a chassis 14, suitable ground wheels 16, and a driver's cab 18. A crane upper 20 is mounted on chassis 14 and is horizontally rotatable thereon in either direction. Crane upper 20 comprises a suitable supporting framework 22 on which a main boom 25 is pivotally mounted. Boom 25 is pivotable vertically about a pin 26 which is connected to frame 22. Boom 25 is pivotable vertically about pin 26 to raised and lowered positions by means of a hydraulic lift cylinder 28 which is pivotally connected at one end by a pin 30 to frame 22 and which is pivotally connected at its other end to boom 25 by a pin 32. Extension and retraction of cylinder 28 effects raising or lowering of boom 25. Boom 25 is shown in FIG. 1 in its stored position on vehicle 12 wherein it is generally disposed lengthwise of the vehicle and in a generally horizontal position.

As FIGS. 1 and 2 show, boom 25 comprises five boom sections, namely: boom base section 36, inner mid section 38, outer mid section 40, fly section 42, and manual section 44. Inner mid section 38 telescopes within base section 36, outer mid section 40 telescopes within inner mid section 38, fly section 42 telescopes within outer mid section 40 and manual section 44 telescopes within fly section 42. Base section 36 is provided at its rear or lower end with a mounting bracket 27 by means of which it is secured by pin 26 to frame 22 of crane upper 20. Manual section 44 is provided at its outer end (the boom point) with a head 29 on which, for example, a pulley or other working device can be mounted. A winch 31 is mounted on frame 22 for a load hoist line (not shown) for boom 25.

As FIG. 4 shows, three hydraulic cylinders or rams are disposed within boom 25 and are operable to extend and retract the movable boom sections as hereinafter described. One cylinder designated as the inner mid cylinder 50 is connected between base section 36 and inner mid section 38 to effect movement of the latter. The second cylinder designated as the outer mid cylinder 52 is connected between the inner mid section 38 and the outer mid section 40 to effect movement of the latter. The third cylinder designated as the fly cylinder 54 is connected between the outer mid section 40 and the fly section 42 to effect movement of the latter. More specifically, inner mid cylinder 50 is connected at one end by a pin 56 to base section 36 and is connected at its other end by a pin 57 to inner mid section 38. Outer mid cylinder 52 is connected by a pin 58 to the inner end mid section 38. An intermediate portion of outer mid cylinder 52 is connected by trunnion means 59 to the rear end of outer mid section 40. The forward end of outer mid cylinder 52 is provided with a hole 60 by means of which it is releasably connectable to manual section 44 as hereinafter explained. One end of fly cylinder 54 is connected by a pin 62 to the inner end of outer mid section 40. Trunnion means 66 located at an intermediate point on fly cylinder 54 are connected to fly section 42. As FIG. 3 shows, a first solenoid operated pinning means 68 is mounted within manual section 44 at the rear end thereof. The solenoid coil 63 of means 68 is normally de-energized and in such condition its pin 69 is retracted. Another pinning means 70 is mounted within manual section 44 forward of pinning means 68 and its pin 73 is extendable through a hole 61 in manual section 44. Soelnoid coil 71 of means 70 is normally deenergized and in such condition its pin is extended through hole 61 in manual section 44 into either hole 65 or hole 67 in fly section 42 as hereinafter explained.

Figure 6:
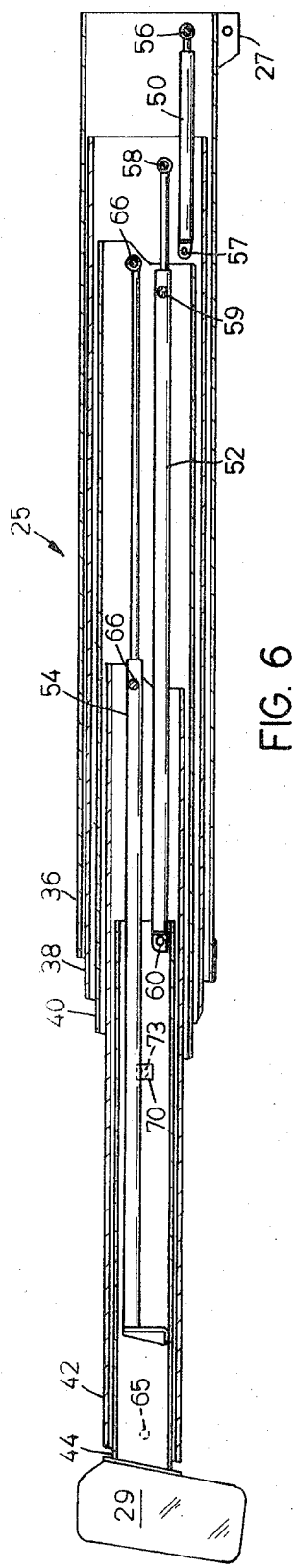
FIG. 6 is a cross-sectional view of the boom taken on line 6—6 of FIG. 5.
Figure 5:
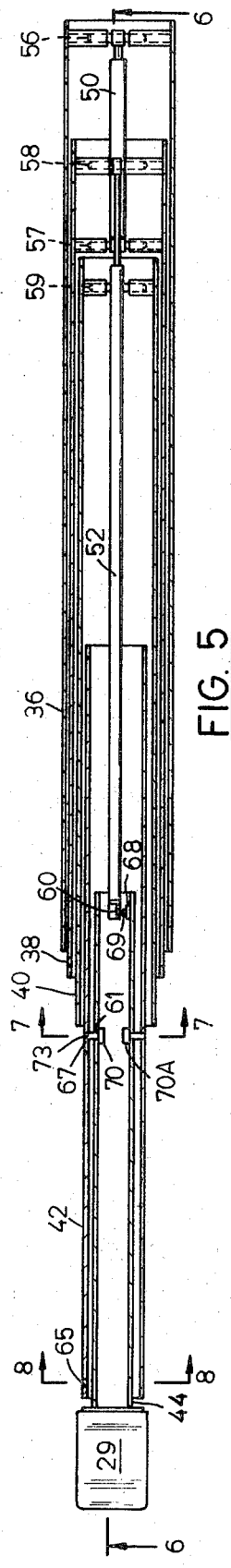
FIG. 5 is a cross-sectional view of the boom similar to FIG. 3 but showing the certain boom sections extended.

In FIGS. 1, 2, 3, and 4 of the drawings, boom 24 is shown in a condition wherein all movable boom sections are fully retracted, all operating cylinders are fully retracted, and the solenoid coils of the pinning means 68 and 70 are deenergized. In FIGS. 5 and 6 boom 25 is shown with fly section 42 fully extended and with manual section 44 fully telescoped within fly section 42. In FIGS. 9 and 10, boom 25 is shown with manual section 44 fully extended and pinned to fly section 42 with all boom sections except manual section 44 fully retracted.

Figure 7:
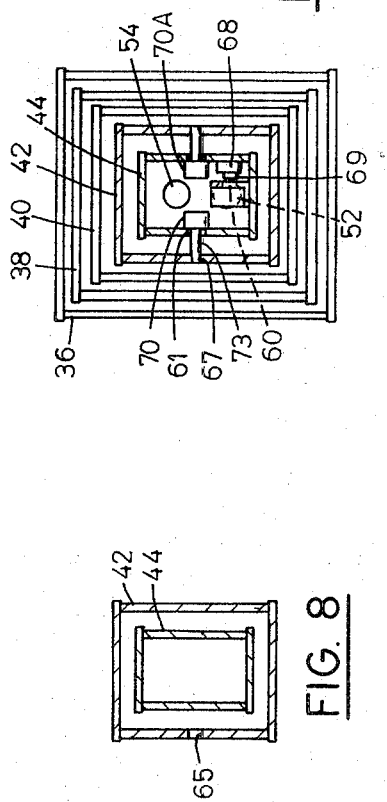
FIG. 7 is a cross-sectional view of the boom taken on line 7—7 of FIG. 5.
Figure 8:
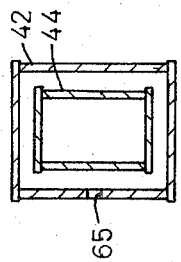
FIG. 8 is a cross-sectional view of the boom taken on line 8—8 of FIG. 5.
Figure 12:
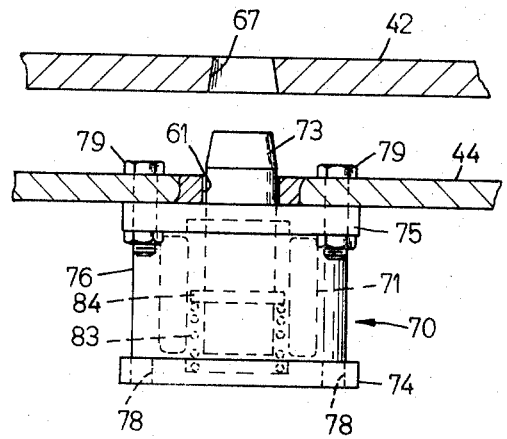
FIG. 12 is a top plan view of a mechanism generally similar to that shown in FIG. 11 but of a type wherein its pin retracts when the solenoid coil is energized.
Figure 13:
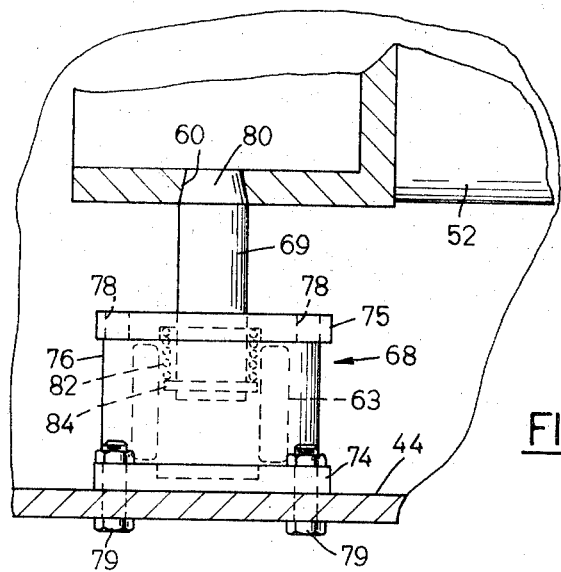
FIG. 13 is a top plan view of a mechanism generally similar to that shown in FIG. 11 but of a type wherein its pin extends when the solenoid coil is energized.
Figure 11:
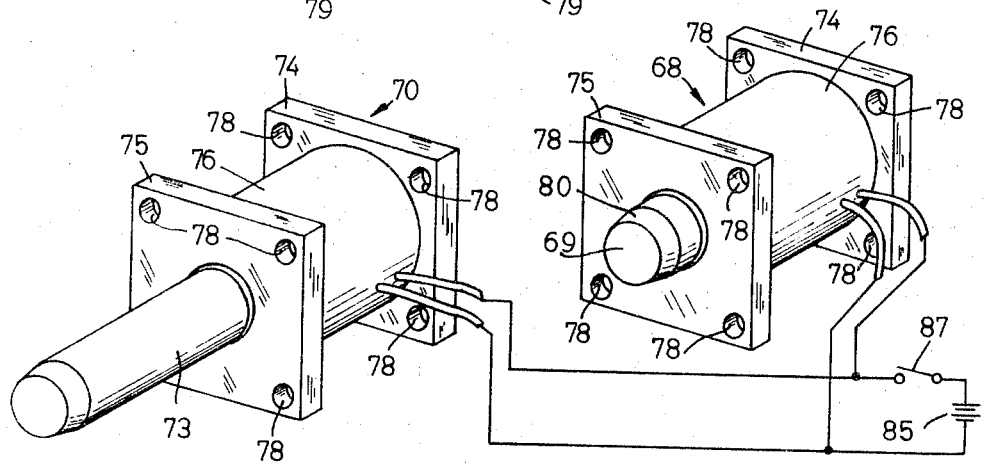
FIG. 11 is an enlarged isometric view of a type of solenoid operated pin mechanism used in the boom in accordance with the present invention.

In the embodiment of the invention disclosed herein, pinning means 68 and pinning means 70 are disclosed. Pinning means 68 is shown as comprising a single solenoid operated pin and pinning means 70 is also shown as comprising a single solenoid operated pin. However, in an actual embodiment of the present invention it is preferred that two forward pinning means 70 and 70A be provided, each identical, one on each side of manual section 44, so as to provide for equalized distribution of forces when the pinning means effects engagement between the manual section 44 and fly section 42. For purposes of simplification in the present description, however, only one forward solenoid operated pin mechanism 70 is hereinafter described in detail. As FIGS. 11, 12 and 13 show, each solenoid operated pin mechanism or pinning means 68 and 70 comprises two spaced-apart support plates 74 and 75 which are rigidly interconnected by a collar 76. Each support plate is provided with a plurality of suitable holes such as 78 which adapt it for rigid mounting on manual section 44 by suitable bolts 79. The mechanisms 68 and 70 comprises solenoid coils 63 and 71, respectively, which are disposed between the base plates of the mechanism and inside the collar 76. As FIGS. 3, 7, and 13 show mechanism 68 is mounted on the inside of the side wall of manual section 44 for cooperation with hole 60 in the forward end of outer mid cylinder 52. Mechanism 68 comprises an axially movable pin 69 which is generally cylindrical along its length but which is provided with a tapered portion 80 at its working end for cooperation with hole 60 which is also correspondingly tapered. As FIG. 12 shows, pin 73 of mechanism 70 is similar in configuration to pin 69 and hole 67 in fly section 42 is correspondingly tapered. In the embodiment of the invention disclosed herein, it is preferred that pin 69 of mechanism 68 be normally biased inward into a disengaged position by means of a biasing spring 82 which is disposed around pin 69 between one of the end plates 75 and a shoulder 84 on pin 69. With this arrangement, when solenoid coil 63 of mechanism 68 is de-energized, biasing spring 82 acts to retract pin 69. However, when coil 63 is energized pin 69 extends and engages hole 60 in outer mid cylinder 52, provided the latter is in position to be so engaged. As FIG. 12 shows mechanism 70 is similar to mechanism 68 shown in FIG. 13, however, biasing spring 83 is disposed around pin 73 between shoulder 84 and base plate 74 so as to effect extension of pin 73 when solenoid coil 71 is de-energized. As FIG. 11 shows each solenoid coil 63 or 71 is adapted to be connected to a suitable power source such as a battery 85 through a manually operable switch 87. In preferred embodiment of the invention, the solenoid coils 63 and 71 are connected in parallel with each other.

The method of extending and retracting the sections of the boom disclosed herein will now be described. Assume that all retractable boom sections are retracted and that the boom is in the horizontal road transport position as shown in FIGS. 1, 2, 3, and 4. Further assume that the inner mid cylinder 50, the outer mid cylinder 52 and the fly cylinder 54 are fully retracted. Further assume that the solenoid coils 63 and 71 of the pinning means 68 and 70, respectively, are both deenergized. With these assumptions the pin 73 of pinning means 70 is extended through hole 61 in manual section 44 into hole 67 in fly section 42. The pin 69 of pinning means 68 is retracted and not in engagement with any component.

The boom 25 is now ready to be fully extended in accordance with the following procedure. Fly cylinder 54 is fully extended to extend fly section 42. Since manual section 44 is pinned to fly section 42 by pinning means 70, manual section 44 is moved outwardly along with fly section 42 so that the crane components assume the position shown in FIGS. 5 and 6. Solenoid coil 71 of pinning means 70 is then energized to effect retraction of pin 73 from hole 67 in fly section 42. Solenoid coil 63 of pinning means 68 is then energized (while coil 71 is still energized) to effect extension of pin 69 into hole 60 at the extreme outer end of outer mid cylinder 52. If preferred, the solenoid coils of pinning means 68 and 70 may be wired so as to operate simultaneously by means of a single switch as disclosed herein or may be energized and de-energized individually. Extension of pin 69 of pinning means 68 connects manual section 44 to outer mid cylinder 52 so that manual section 44 will remain stationary and extended when fly section 42 is retracted. Fly cylinder 54 is then retracted to retract fly section 42 so that all components assume the position shown in FIGS. 9 and 10. Solenoid coil 71 of pinning means 70 is then de-energized to effect extension of pin 73 so that pin 73 engages forward hole 65 in fly section 42. This locks manual section 44 in extended position with respect to fly section 42. Solenoid coil 63 of pinning means 68 is then de-energized to effect retraction of its pin 69 from hole 60 in outer mid cylinder 52 so as to disconnect the end of the outer mid cylinder from manual section 44. Fly cylinder 54 is then extended to extend fly section 42 outwardly of outer mid section 40. It is to be noted that manual section 44 and fly section 42 now move as a unit. Outer mid cylinder 52 is then extended to extend outer mid section 40 outwardly from inner mid section 38. Inner mid cylinder 50 is then extended to extend inner mid section 38 outwardly of base section 36.

It is to be noted that at this point the solenoids of pinning means 68 and 70 are de-energized (such deenergization having taken place simultaneously, if preferred, by operation of a single switch). Furthermore, at this point boom 25 may be operated in the known manner either by simultaneous or individual actuation of the several operating cylinders to effect extension and retraction of the various boom sections, with manual section 44 always being pinned to and movable with fly section 42.

The procedure for retracting the sections of boom 25 and placing it in readiness to be stored on vehicle 12 is as follows. Inner mid cylinder 50, outer mid cylinder 52, and fly cylinder 54 are retracted to position inner mid section 38, outer mid section 40, and fly section 42 in fully retracted position as shown in FIGS. 9 and 10. Since the solenoids of both the pinning means 68 and 70 are assumed to be deenergized, pin 69 of pinning means 68 is retracted and pin 73 of pinning means 70 is extended, therefore, manual section 44 is still extended from and pinned to fly section 42 as shown in FIGS. 9 and 10. At this point, the solenoid coils 63 and 71 of the pinning means 68 and 70, respectively, are energized to effect operation of the pins. Thus, pin 73 retracts from hole 65 in fly section 42 and pin 69 of pinning means 68 extends to engage hole 60 in the outer end of outer mid cylinder 52. While the solenoids of both pinning means 68 and 70 are energized, fly cylinder 54 is fully extended to extend fly section 42 so that the latter telescopes around manual section 44 as shown in FIGS. 5 and 6. At this point, both solenoid coils are de-energized so as to effect retraction of pin 69 and extension of pin 73. Retraction of pin 69 disconnects manual section 44 from outer mid cylinder 52. Extension of pin 73 into hole 67 of fly section 42 pins the fly section to the manual section 44. Fly cylinder 54 is then retracted to effect retraction of fly section 42 into outer mid section 40. During such retraction manual section 44 travels with fly section 42. The boom 25 and its components have not resumed the position shown in FIGS. 1, 2, 3, and 4. Since the solenoid coils are de-energized and pin 73 is, therefore, extended, manual section 44 is rigidly secured to fly section 42 for over-the-road transport of the crane, or operation of the boom with a retracted manual section.

RESUME

The present invention provides improved means for extending and retracting an end section (hereinafter referred to as a manual section 44) of a multisection telescopic crane boom 25, such as is used on a mobile crane 10, that lacks its own extend-retract hydraulic cylinder. The invention contemplates a boom 25 having, for example, five tubular sections, namely: a base section 36, an inner mid section 38, an outer mid section 40, a fly section 42, and a manual section 44. The invention further contemplates, for example, three linearly extendable and retractable hydraulic cylinders, namely: an inner mid cylinder 50 connected to and between base section 36 and inner mid section 38 for moving the latter section; an outer mid cylinder 52 connected to and between inner mid section 38 and outer mid section 40 for moving the latter section; and a fly cylinder 54 connected to and between outer mid section 40 and fly section 42 for moving the latter section.

In accordance with the invention, at least one forward pinning hole 65 is provided near the forward end of the fly section 42 and at least one rear pinning hole 67 is provided near the rear end of the fly section 42. The outer mid cylinder 52 is also provided with a pinning hole 60 near the forward end thereof. Two remotely controlled solenoid operated tapered pins 69 and 73 mounted in longitudinally spaced apart relationship on manual section 44 cooperate with the two pin holes 65 and 67 in the fly section 42 and with pin hole 60 on the outer mid cylinder 52 to facilitate extension (for use) and retraction (for storage) of the manual section 44. When the solenoids 63 and 71 are deenergized, (preferably simultaneously), the forward pin 73 extends and the rear pin 69 retracts. When the solenoids 63 and 71 are energized (preferably simultaneously), the forward pin 73 retracts and the rear pin 69 extends. Extending the manual section 44 in accordance with the invention usually involves initially providing the boom 25 with all movable sections retracted, all cylinders retracted and both solenoids deenergized. The fly cylinder 54 is extended to extend the fly section 42 with the manual section 44 pinned thereto by pin 73. Both solenoids 63 and 71 are energized to unpin the manual section 44 from the fly section 42 and to pin the manual section 44 to the outer mid cylinder 52 by pin 69. The fly cylinder 54 is retracted to expose the manual section 44 and the solenoids 63 and 71 are deenergized to repin the manual section 44 (now extended) to the fly section 42 and to unpin the manual section 44 from the outer mid cylinder 52. A method for retracting the extended manual section 44 involves energizing the solenoids 63 and 71 to unpin the manual section 44 from the fly section 42 and to pin the manual section 44 to the outer mid cylinder 52. The fly section 42 is extended to enclose the manual section 44 and the solenoids 63 and 71 are deenergized to pin the manual section 44 to the fly section 42 and to unpin the manual section 44 from the outer mid cylinder 52. The fly cylinder 54 is retracted to retract the fly section 42 with the manual section 44 pinned therewithin.

I claim:

1. In a mobile crane; a vehicle, a telescopic boom pivotally mounted on said vehicle and comprising a base section, a first section telescopable within said base section; a second section telescopable within said first section, a third section telescopable within said second section and having two longitudinally spaced apart forward and rear pin holes therein, a fourth section telescopable within said third section; an extendable and retractable operating cylinder connected between said base section and said first section for extending and retracting said first section; a first extendable and retractable cylinder connected between said first section and said second section for extending and retracting said second section, said first cylinder having a pin hole therein; a second extendable and retractable cylinder connected between said second section and said third section for extending and retracting said third section; means to extend and retract each of said cylinders; a rearward remotely operated pinning means mounted on the interior of said fourth section and having a rear pin extendable for releasable engagement with said pin hole in said first cylinder; a forward remotely operated pinning means mounted on the interior of said fourth section forwardly of said rearward pinning means and having a forward pin extendable through a hole in said fourth section and releasably engageable with either of said pin holes in said third section; each of said forward and rearward pinning means comprising a solenoid for extending and retracting its pin and wherein the solenoid for said rearward pinning means is deenergizable to retract its pin and the solenoid for said forward pinning means is deenergizable to extend its pin, said rear pin normally being retracted and disengaged from said pinning hole in said first cylinder while all said sections are telescoped, said forward pin normally being extended and releasably engaged with said rear pin hole in said third section while all said sections are telescoped; said second cylinder being extendable to effect extension of said third section and said fourth section pinned thereto; means to remotely operate said forward and rearward pinning means while said third and fourth sections are extended to extend said rear pin into releasable engagement with said pin hole in said first cylinder and to retract said forward pin from engagement with said rear pin hole in said third section; said second cylinder being retractable to effect retraction of said third section while said fourth section is maintained extended by being pinned to said first cylinder; and means for energizing or deenergizing said solenoids simultaneously to remotely operate said forward and rearward pinning means while said third section is retracted to retract said rear pin from engagement with said pin hole in said first cylinder and to extend said forward pin into releasable engagement with said forward pin hole in said third section.

* * * * *